Patented Dec. 27, 1927.

1,653,882

UNITED STATES PATENT OFFICE.

FREDRICK E. SOUTHWAY, OF SOMERVILLE, MASSACHUSETTS.

FOOD PRODUCT AND PROCESS OF PREPARING THE SAME.

No Drawing. Application filed April 27, 1927. Serial No. 187,120.

This invention aims to provide improvements in food products and processes of preserving the same.

This application is filed as a substitute for and takes the place of my application Serial No. 736,358, filed September 6, 1924.

A food product constituting the preferred form of my invention includes a base of flavoring food, such, for example, as ham and eggs, salmon, etc., (cooked), a vegetable oil (preferably carrying a mixture of spices hereinafter described) and an absorbent carrier for the oil (such for instance as flaked bread crumbs), and such additional seasoning or flavoring, if any, as desired, the whole combination providing an appetizing, attractive food product primarily, though not exclusively adapted to be spread between slices of bread, or eaten as a salad, but which may be prepared and eaten in any other desired manner. When it is desired to preserve the product for long periods, as where it is manufactured for retailers' stock, it is preferably packed in glass jars or any other type of air-tight containers used in marketing food.

The best method which I have found in making a food product containing the above referred to ingredients follows. First I prepare the liquid spice mixture by boiling together the following ingredients:—water, granulated sugar, salt, vinegar, black pepper, cassia, and allspice. The ingredients of this mixture may be varied and the amounts of such ingredients to be made at any one time may also be varied, but I have found the following formula highly satisfactory.

16 ounces of water.
32 ounces of granulated sugar.
5/8 of an ounce of salt.
2 ounces of vinegar.
7/64 of an ounce of black pepper.
7/64 of an ounce of cassia.
7/64 of an ounce of allspice.

I place the above-mentioned ingredients in a suitable container and boil slowly until they become a saturated solution about the consistency of a syrup.

As a second operation I add 80 cubic centimeters of the above described syrup to a gallon of vegetable oil (preferably a corn oil) and I also add to this mixture 1/16 of an ounce of red pepper and 1/8 of an ounce of paprika. These should be thoroughly mixed and preferably permitted to set for several hours in a warm place before using.

The third step includes cutting the absorbent carrier, preferably leavened bread, into strips. These strips are then dipped into the spiced oil and put through a suitable cutting or grinding machine which cuts it into small flakes. These flakes are thoroughly saturated with the spiced oil. While the bread need not be dipped into the oil before being flaked, I have found it preferable to do so, because the oil prevents the flakes from becoming "doughy" when the bread is passed through the machine for flaking it.

The fourth step includes the mixing operation. This includes mixing the oil-saturated bread flakes with the desired quantity of flavoring food in a suitable mixing machine which thoroughly intermixes the ingredients. The seasoning of salt, pepper, relish and any other desired seasoning is added during this mixing operation, so that when the product is delivered from the mixer it is ready to be packed.

Any suitable containers may be used for the mixture, for instance glass jars having covers in which the mixture may be hermetically sealed. The food product is of smooth texture and may be easily spread on bread. It may be used as a salad, made into croquettes, baked, fried or eaten in any other desired manner. Furthermore, the mass when properly proportioned is not oily, nor does it appear oily when in the jars even after it has been stored for along periods of time. This is due to the fact that the bread flakes maintain proper distribution of the oil at all times.

The spiced oil preserves the product, and even after the jars are open the contents keep for an astonishingly long time without spoiling, especially considering that the thoroughly dissolved spiced oil permits the omission of formaldehyde, benzoate of soda or other usual chemical preservative.

Some of the products which I have made successfully and which are now being marketed, are those which include the following flavoring foods:—salmon, kippered herring, ham and cheese, ham and eggs, cheese, (which may be used for Welsh rabbit), stuffed eggs and fig and honey. To give an example merely I will describe the operation which I have found satisfactory in making one of the products just mentioned.

Ham and egg.

To each pound of bread add ten ounces of the spiced oil, four eggs (hard boiled), four ounces of relish, one pound of baked ham, one thirty-second of an ounce of paprika, one sixty-fourth of an ounce of red pepper, ten cubic centimeters of vinegar and three sixteenths of an ounce of salt. In making up the above the same method as previously described may be followed.

While I have found it preferable to mix the various ingredients of the food product in the manner in which I have described, I have found that in some instances at least the whole formula may be mixed at one operation, that is to say, all of the ingredients may be placed in a single machine which will perform the operations of grinding the ingredients while at the same time mixing them.

The leavened bread should preferably be from twenty-four to thirty-six hours old, and I have found that is preferable to flake the bread rather than to grind it so finely as to act as a powder, because the flakes absorb the oil more readily and distribute it more evenly when mixed with the flavoring food.

While I have specifically described a certain formula and mentioned a few other kinds of food products which may be made by formulas resembling the formula specifically described, it will be understood that the same general method (and preserving and carrying mixture) may be used for making a large variety of food products of similar texture.

My improved method provides wholesome, appetizing food products containing only pure, nutritious ingredients, which are well preserved and which when properly combined and mixed will remain in complete admixture without separation of the oil or any of the other ingredients from the oil. Age does not deteriorate but improves the food after it has been placed in the containers, because the flavor of the predominating food permeates the remaining ingredients and imparts to them the various flavors so that, from a standpoint of taste, the product is for practical purposes homogenous.

While I have described preferred embodiments of my invention, it will be understood I have done so for purposes of clarification, and not of limitation, my invention being best defined in the following claims.

I claim—

1. A canned food product which comprises a predominating flavoring food, an edible liquid preservative, and an edible highly porous ingredient adapted to absorb the liquid preservative, said flavoring food, preservative and highly porous ingredient being thoroughly mixed and said highly porous ingredient acting as a carrier for the liquid preservative to keep it thoroughly distributed throughout the product.

2. A canned food product which comprises a predominating flavoring food, an edible liquid preservative having a base of vegetable oil, and an edible highly absorbent ingredient, said flavoring food, preservative and absorbent ingredient being mixed to provide a homogenous mass which may be easily spread, said highly absorbent ingredient acting as a carrier for the liquid preservative to keep it thoroughly distributed throughout the product.

3. A canned food product which comprises a predominating flavoring food, an edible liquid preservative, said liquid preservative comprising a base of spiced vegetable oil, and an edible highly absorbent ingredient, said flavoring food, preservative and absorbent ingredient being thoroughly mixed to provide a homogenous mass which may be easily spread, said highly absorbent ingredient acting as a carrier for the liquid preservative to keep it thoroughly distributed throughout the product.

4. A canned food product which comprises a predominating flavoring food, an edible liquid preservative, and flaked leavened bread adapted to absorb the liquid preservative, all the ingredients being thoroughly mixed to provide a homogenous mass which may be easily spread, said flaked leavened bread acting as a conveyor for the liquid preservative to keep it thoroughly mixed with the flavoring food.

5. The process of preparing a food product for sandwiches, salads, rabbits, or the like which comprises mixing together suitable quantities of a flavoring food, a highly absorbent edible food, and a liquid-preserving mixture so that the highly absorbent food will absorb the liquid-preserving mixture and hold it in intermixed relation with said flavoring food to prevent the latter from deteriorating.

6. The process of preparing a food product for sandwiches, salads, rabbits or the like which comprises providing pieces of highly absorbent edible food, dipping said pieces in a liquid-preserving mixture, thereafter flaking the dipped pieces and then mixing the flaked food with a predominating flavoring food to provide a mass which retains the liquid preservative distributed therethrough.

7. A canned food product which comprises a predominating flavoring food, an edible liquid preservative, and an edible highly porous ingredient adapted to absorb the liquid preservative, said flavoring food, preservative and highly porous ingredient being thoroughly mixed and said highly porous ingredient acting as a carrier for the liquid preservative to keep it thoroughly distributed throughout the product, the entire product by weight comprising between 35% and 65% of flavoring food, between 12% and 25% of liquid preservative and between 20% and 35% of the highly porous ingredient, the rest comprising the seasoning and relish, if used.

In testimony whereof, I have signed my name to this specification.

FREDRICK E. SOUTHWAY.